US009716832B2

United States Patent
Ryu et al.

(10) Patent No.: US 9,716,832 B2
(45) Date of Patent: Jul. 25, 2017

(54) APPARATUS AND METHOD FOR STABILIZING IMAGE

(71) Applicant: HANWHA TECHWIN CO.,LTD., Changwon-si (KR)

(72) Inventors: Yeon-Geol Ryu, Changwon (KR); Hwal-Suk Lee, Changwon (KR); Sang-Ji Park, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 699 days.

(21) Appl. No.: 14/075,768

(22) Filed: Nov. 8, 2013

(65) Prior Publication Data

US 2015/0015727 A1 Jan. 15, 2015

(30) Foreign Application Priority Data

Jul. 12, 2013 (KR) ........................ 10-2013-0082470

(51) Int. Cl.
H04N 5/232 (2006.01)
G06T 7/20 (2017.01)

(52) U.S. Cl.
CPC ........... H04N 5/23254 (2013.01); G06T 7/20 (2013.01); H04N 5/23267 (2013.01)

(58) Field of Classification Search
CPC ................. H04N 5/23254; H04N 5/23264
See application file for complete search history.

(56) References Cited

U.S. PATENT DOCUMENTS

| 5,748,231 A | 5/1998 | Park et al. |
| 6,625,214 B1 * | 9/2003 | Umehara ........... G06K 9/00765 348/595 |
| 8,116,576 B2 | 2/2012 | Kondo |
| 8,139,885 B2 * | 3/2012 | Hsu .................... H04N 5/23248 348/154 |
| 2006/0177209 A1 * | 8/2006 | Miyasako .............. G03B 19/12 396/55 |
| 2006/0291841 A1 * | 12/2006 | Fukumoto ................ G03B 5/00 396/55 |
| 2007/0140528 A1 * | 6/2007 | Anai ..................... G06T 7/0028 382/106 |

(Continued)

FOREIGN PATENT DOCUMENTS

JP 5008421 B2 8/2012
KR 1997-0004927 B1 4/1997
KR 10-2004-0083822 A 10/2004

*Primary Examiner* — William C Vaughn, Jr.
*Assistant Examiner* — Jerry Jean Baptiste
(74) *Attorney, Agent, or Firm* — Sughrue Mion, PLLC (57) ABSTRACT

Provided are an apparatus and method for outputting a stabilized image even when a camera sways. The method includes: applying a first compensated motion to the image to acquire a first stabilized image, wherein an accumulation result of first motions, each of which is estimated between adjacent images from a reference image to an arbitrary image, is inversely transformed into the first compensated motion; and acquiring a second motion estimated between the reference image and the first stabilized image and applying the accumulation result of the first motions and a second compensated motion to the image to acquire a second stabilized image. An accumulation result of the second motion is inversely transformed into the second compensated motion.

20 Claims, 6 Drawing Sheets

(56) References Cited

U.S. PATENT DOCUMENTS

2008/0165280 A1* 7/2008 Deever ............... H04N 7/0132
                                                                         348/497
2010/0014709 A1   1/2010 Wheeler et al.
2010/0134640 A1* 6/2010 Kuo ....................... G06T 7/20
                                                                         348/208.6

* cited by examiner

FIRST IMAGE
(n−1th IMAGE, PREVIOUS IMAGE)

SECOND IMAGE
(nth IMAGE, CURRENT IMAGE)

FIG. 6

APPARATUS AND METHOD FOR STABILIZING IMAGE

CROSS-REFERENCE TO RELATED APPLICATION(S)

This application claims the benefit of Korean Patent Application No. 10-2013-0082470, filed on Jul. 12, 2013, in the Korean Intellectual Property Office, the disclosure of which is incorporated herein in its entirety by reference.

BACKGROUND

1. Field

Apparatuses and methods consistent with exemplary embodiments relate to providing an apparatus and a method for stably outputting an image even when a camera sways.

2. Description of the Related Art

As the use of multimedia devices has increased, demand for image enhancement techniques for digital images captured in various environments has also increased. Examples of image enhancement techniques include removing of image smearing, noise removing, and image stabilization techniques, which have a wide range of applications in photographing apparatuses, such as a digital camera, a smartphone, a home camera or camcorder, an industrial monitoring camera, a broadcasting camera, a military camera, etc. Initially, photographing apparatuses digitized an analog image to form digital image. However, recently used photographing apparatuses in the related art apply various types of line processing and post-processing correction techniques to acquire a digital image having a better image quality than an analog image.

An image stabilization technique is the most generally used among digital image correction techniques. If a user captures an image when a photographing apparatus when moving, swaying of the photographing apparatus occurs. Also, a camera that is installed on a transportation means, such as a car, an airplane, a helicopter, or the like, involuntarily sways due to several environmental factors such as mechanical vibrations, friction with the ground, etc. Swaying of a screen becomes more serious with a slight movement of a camera if the camera is using a high magnifying power when capturing an image. As described above, if a photographing apparatus sways when capturing an image, an image stabilization technique acquires a clear image by removing the undesired swaying occurring in the captured image.

A digital image stabilization technique is used to detect undesired swaying through motion estimation between frames of an input image signal and read image data, whose motion has been compensated, from a frame memory or a charge-coupled device (CCD) in order to correct swaying. The digital image stabilization technique is cheaper, more accurate than a mechanical method, and capable of compensating for various motions that are not compensated by a mechanical stabilizing technique. Therefore, in the related art, the digital image stabilization technique has been actively studied.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments provide an apparatus and a method for removing a drift error remaining after image stabilization processing to reduce image deterioration.

Additional aspects will be set forth in part in the description which follows and, in part, will be apparent from the description, or may be learned by practice of exemplary embodiments.

According to an aspect of an exemplary embodiment, there is provided a method including: applying a first compensated motion to the image to acquire a first stabilized image, wherein an accumulation result of first motions, each of which is estimated between adjacent images from a reference image to an arbitrary image, is inversely transformed into the first compensated motion; and acquiring a second motion estimated between the reference image and the first stabilized image and applying the accumulation result of the first motions and a second compensated motion to the image to acquire a second stabilized image, wherein an accumulation result of the second motion is inversely transformed into the second compensated motion.

The first stabilized image may include drift errors with respect to the first motions.

The second stabilized image may be an image from which the drift errors have been removed by the second compensated motion.

The acquiring of the first stabilized image may include: acquiring the first compensated motion into which the accumulation result of the first motions, each of which is estimated between adjacent images from the reference image to the arbitrary image, is inversely transformed; and inversely applying the first compensated motion to the image to acquire the first stabilized image.

The acquiring of the first compensated motion may include: extracting characteristic points from a first image of the adjacent images; tracking the characteristic points within a second image of the adjacent images to acquire corresponding points corresponding to the characteristic points; estimating a first motion of the first motions as a motion of the second image with respect to the first image by using the corresponding points; and acquiring the first compensated motion into which an accumulation result of the first motion and other first motions of the first motions, each of which is estimated between the adjacent images from the reference image to a previous image, is inversely transformed.

The extracting of the characteristic points may include: reducing the first image and acquiring an edge image; and in response to the number of edges existing in an arbitrary block of the edge image exceeding a threshold value, extracting the arbitrary block as a characteristic point of the characteristic points.

The estimating of the first motions may include estimating of the first motions comprising movements, rotations, and size changes of the corresponding points.

The acquiring of the second stabilized image may include: acquiring the second motion estimated between the reference image and the first stabilized image; acquiring the second compensated motion into which the accumulation result of the first motions and the accumulation result of the second motion are inversely transformed; and applying the second compensated motion to the image to acquire the second stabilized image.

The acquiring of the second motion may include: extracting characteristic points from the reference image; tracking the characteristic points within the first stabilized image to acquire corresponding points corresponding to the characteristic points; and estimating the second motion as a motion of the first stabilized image with respect to the reference image by using the corresponding points.

The extracting of the characteristic points may include: reducing the reference image and acquiring an edge image; and in response to the number of edges existing within an arbitrary block of the edge image exceeding a threshold value, extracting the arbitrary block as a characteristic point of the characteristic points.

The acquiring of the second motion may include acquiring the second motion comprising movements, rotations, and size changes of the corresponding points.

According to an aspect of another exemplary embodiment, there is provided an apparatus for stabilizing an image, including: a first stabilized image acquirer configured to accumulate first motions, each of which is estimated between adjacent images from a reference image to an arbitrary image, and inversely apply the accumulation result as a first compensated motion to the image to acquire a first stabilized image; and a second stabilized image acquirer configured to acquire a second motion, estimated between the reference image and the first stabilized image, and apply a second compensated motion, into which the accumulation result of the first motions and the accumulation result of the second motion are inversely transformed, to the image to acquire a second stabilized image.

The first stabilized image may include drift errors with respect to the first motions, and the second stabilized image is an image from which the drift errors have been removed by the second compensated motion.

The first stabilized image acquirer may include: a first compensated motion acquirer configured to acquire the first compensated motion into which an accumulation result of the first motions, each of which is estimated between adjacent images from the reference image to the arbitrary image, is inversely transformed; and a first stabilized image outputter configured to apply which applies the first compensated motion to the image to output the first stabilized image.

The first compensated motion acquirer may be further configured to extract characteristic points from a first image of the adjacent images, track the characteristic points within a second image of the adjacent images to acquire corresponding points corresponding to the characteristic points, estimate a first motion of the first motions as a motion of the second image with respect to the first image by using the corresponding points, and acquire the first compensated motion into which the first motion and other first motions of the first motions, each of which is estimated between the adjacent images from the reference image to a previous image of the image, are inversely transformed.

The second stabilized image acquirer may include: a second motion acquirer configured to acquire the second motion estimated between the reference image and the first stabilized image; a second compensated motion acquirer configured to acquire the second compensated motion into which the accumulation result of the first motion and the accumulation result of the second motion are inversely transformed; and a second stabilized image outputter configured to apply the second compensated motion to the image to output the second stabilized image.

The second motion acquirer may be further configured to extract characteristic points from the reference image, track the characteristic points within the first stabilized image to acquire corresponding points corresponding to the characteristic points, and estimate the second motion as a motion of the first stabilized image with respect to the reference image by using the corresponding points.

The second motion acquirer may be further configured to reduce the reference image, acquires an edge image, and in response to the number of edges existing in an arbitrary block of the edge image exceeding a threshold value, extract the arbitrary block as a characteristic point of the characteristic points.

The second motion acquirer may be further configured to acquire the second motion comprising movements, rotations, and size changes of the corresponding points.

According to an aspect of another exemplary embodiment, there is provided a non-transitory computer-readable recording medium having recorded thereon a program which, when executed by a computer, performs a method of stabilizing an image including: acquiring a first compensated motion into which an accumulation result of first motions, each of which is estimated between adjacent images from a reference image to an arbitrary image, is inversely transformed; inversely applying the first compensated motion to the image to acquire a first stabilized image; acquiring a second motion estimated between the reference image and the first stabilized image; acquiring a second compensated motion into which the accumulation result of the first motions and an accumulation result of the second motion are inversely transformed; and applying the second compensated motion to the image to acquire a second stabilized image.

BRIEF DESCRIPTION OF THE DRAWINGS

The above and and/or other aspects will become more apparent and more readily appreciated from the following description of exemplary embodiments, taken in conjunction with the accompanying drawings in which.

DETAILED DESCRIPTION OF EXEMPLARY EMBODIMENTS

Hereinafter, certain exemplary embodiments will be described in detail with reference to the attached drawings. Like reference numerals in the drawings denote like elements throughout.

While exemplary embodiments are capable of various modifications and alternative forms, exemplary embodiments thereof are shown by way of example in the drawings and will herein be described in detail. It should be understood, however, that there is no intent to limit exemplary embodiments to the particular forms disclosed, but on the contrary, example embodiments are to cover all modifications, equivalents, and alternatives falling within the scope of the inventive concept.

It will be understood that, although the terms "first", "second", "third", etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. The terminology used herein is for the purpose of describing particular exemplary embodiments and is not intended to be limiting of the exemplary embodiments. As used herein, the singular forms "a", "an", and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The exemplary embodiments may be embodied as functional block structures and various processing operations. These functional blocks may be embodied as the various numbers of hardware and/or software structures that execute particular functions. For example, the exemplary embodiments may use direct circuit structures, such as a memory, processing, logic, a look-up table, etc. that may execute various functions through controls of one or more microprocessors or other control apparatuses. Like elements of the exemplary embodiments may be executed as software programming or software elements. The exemplary embodiments may be embodied as a programming or scripting language such as C, C++, assembly language, or the like, including various algorithms that are realized through combinations of data structures, processes, routines, or other programming structures. Functional aspects may be embodied as an algorithm that is executed by one or more processors. Also, the exemplary embodiments may use related arts to perform electronic environment setting, signal processing, and/or data processing, etc. The terminology, such as a mechanism, an element, a means, or a structure, may be widely used and is not limited as mechanical and physical structures. The terminology may include a series of routines of software along with a processor, etc.

When stabilizing an image, a static camera calculates a motion between a reference image and a currently swayed image and transforms the current image in an opposite direction to the motion to acquire a stabilized image. Here, a performance of stabilizing an image completely depends on a result of calculating the motion between the reference image and the current image. Also, after transforming the image, an image enhancement may be additionally performed.

The performance of stabilizing the image depends on the accuracy of the calculation of the motion between the reference image and the current image. A method of calculating the motion between the reference image and the current image is classified into two methods. In the first method, the motion between the reference image and the current image is directly calculated. In other words, characteristic points are extracted from the reference image, corresponding points corresponding to the characteristic points are tracked from the current image or detected through matching, and the motion between the reference image and the current image is calculated by using the corresponding points. Here, the motion refers to translation, rotation, zoom, or the like.

In the second method, a motion (inter-frame motion) $M_{n-1}^n$ between adjacent images (an $n-1^{th}$ image and an $n^{th}$ image) is calculated and accumulated as in Equation 1 below to calculate a motion $M_0^n$ between a reference image ($0^{th}$ image) and a current image ($n^{th}$ image).

$$M_0^n = M_{n-1}^n \cdot M_0^{n-1} = \prod_1^n M_{n-1}^n \qquad (1)$$

Here, the motion between the adjacent images is calculated by using the same method as the first method. Characteristic points are extracted from a previous image, corresponding points corresponding to the characteristic points are tracked from a current image or detected through matching, and a motion $M_{n-1}^n$ between two adjacent images is calculated.

According to the first method, if great swaying occurs between a reference image and a current image, tracking of characteristic points fails, and thus motion estimation fails. Also, since an image information difference, such as brightness, between the reference image and the current image increases with time, it is difficult to successfully track the corresponding points.

In order to solve these problems, several researchers in the related art use a method of calculating a motion between adjacent images and accumulating the motion as in Equation 1 above. In general, motions of adjacent images are small, and image information of the adjacent images is similar. Therefore, it is easy to track characteristic points from the adjacent images. However, since adjacent motions are accumulated in all image frames to calculate a motion $M_0^n$ between a reference image and a current image, a drift error may not be removed from the motion $M_0^n$, and a probability of failure in image stabilization increases with time. This problem occurs in image stabilization techniques and all types of image processing techniques based on motion estimation. Therefore, in the exemplary embodiments a drift error is removed through image stabilization described with reference to FIGS. 1 through 6 to reduce image deterioration and increase an image stabilization success rate.

Figure 1:
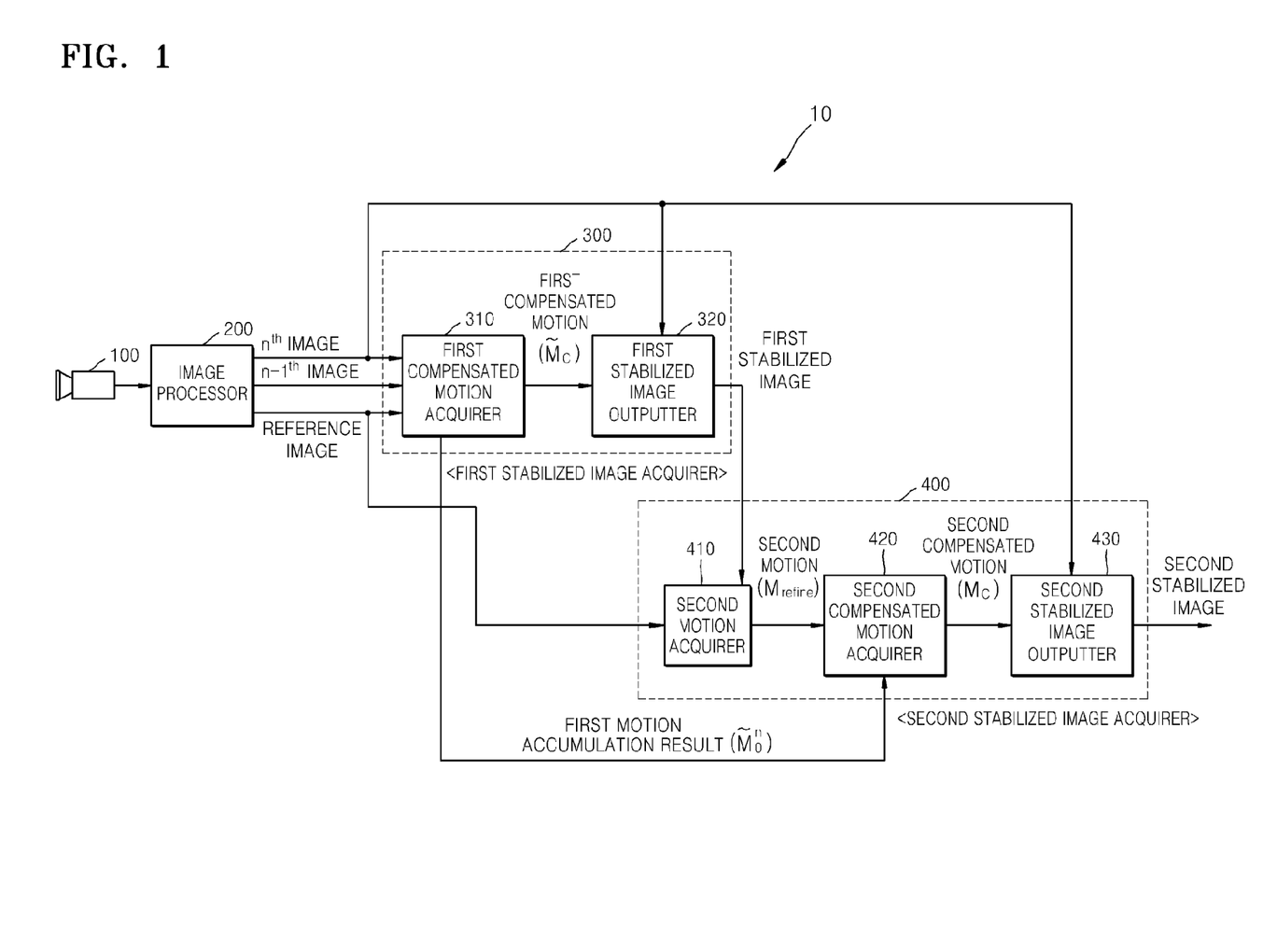
FIG. 1 is a block diagram illustrating a structure of an apparatus for stabilizing an image, according to an exemplary embodiment.

FIG. 1 is a block diagram illustrating a structure of an apparatus 10 for stabilizing an image, according to an exemplary embodiment.

Referring to FIG. 1, the apparatus 10 includes a camera 100, an image processor 200, a first stabilized image acquirer 300, and a second stabilized image acquirer 400.

The camera 100 refers to a left or right camera that captures a subject by using a complementary metal-oxide semiconductor (CMOS) module or a charge-coupled device (CCD) module. First and second images (or moving pictures) of the subject are provided to the CMOS module or the CCD module through a lens, and the CMOS module or the CCD module transforms an optical signal of the subject, which has passed through the lens, into an electrical signal (photographing signal) and outputs the electrical signal. The camera 100 may be a thermal imaging camera. The thermal imaging camera is a camera that detects a temperature difference between an object and a background of the object through radiant energy emitted from the object and transforms the temperature difference into an electrical signal to form an image.

The image processor 200 reduces noise of an image signal output from the camera 100 and performs image signal processing, such as gamma correction, color filter array interpolation, color matrix, color correction, color enhancement, or the like, with respect to the image signal.

The image processor 200 may also compress image data generated through image signal processing for an image enhancement to generate an image file or may restore the image data from the image file. A compression format of an image may be lossless compression format or lossy compression format.

The image processor 200 may perform color processing, blur processing, edge enhancement processing, image analysis processing, image recognition processing, image impact processing, etc. The image processor 200 may also perform face recognition, scene recognition, or the like as the image recognition processing. For example, the image processor 200 may perform luminance level adjustment, color correction, contrast adjustment, contour enhancement adjustment, screen division processing, generation of a character image, synthesizing of images, etc.

Figure 2:
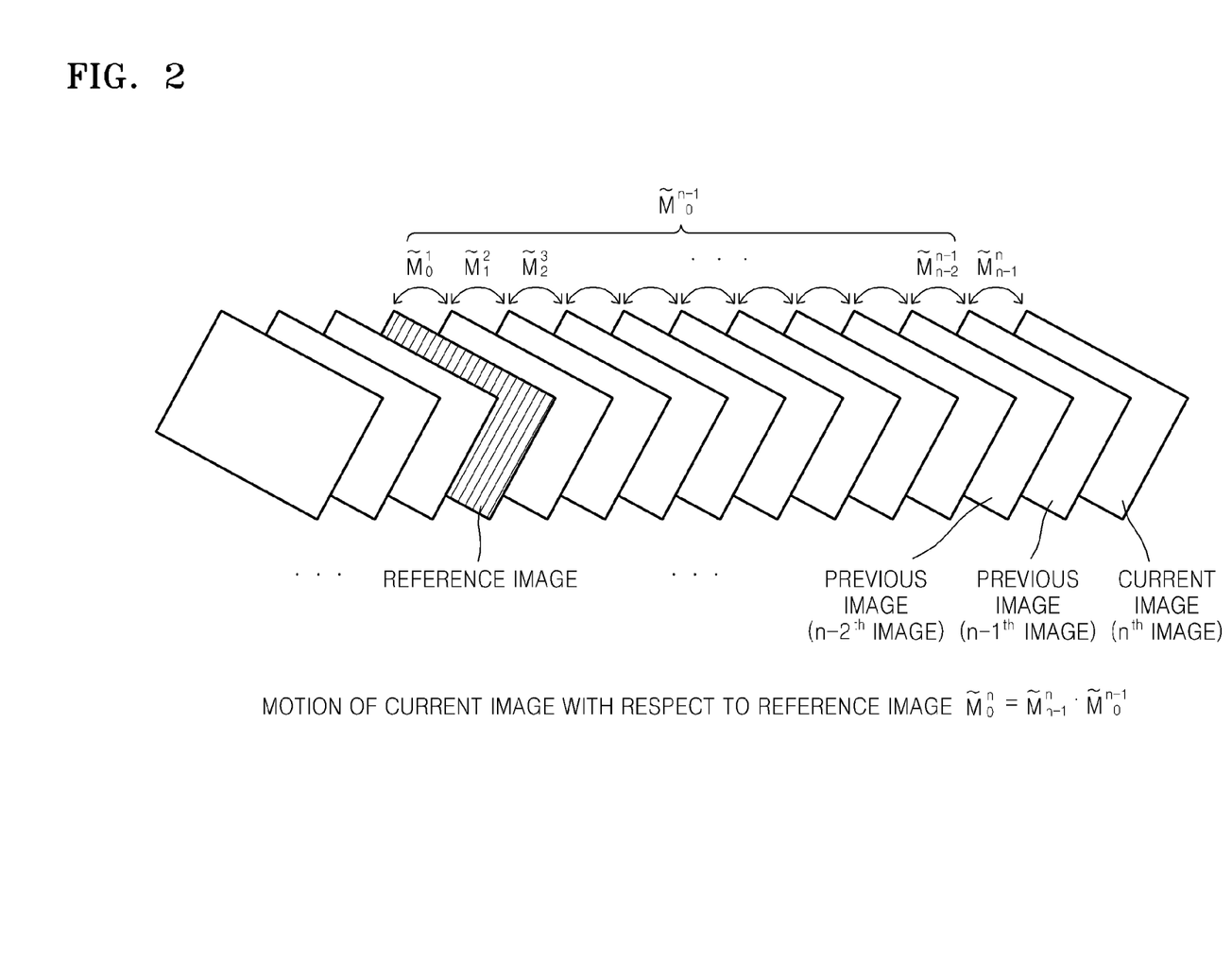
FIG. 2 is a diagram illustrating image frames for stabilizing an image, according to an exemplary embodiment.

The first stabilized image acquirer 300 acquires a first stabilized image by using images that are output from the image processor 200, i.e., adjacent images of a plurality of images from a reference image ($0^{th}$ image) to a current image ($n^{th}$ image), as shown in FIG. 2. The first stabilized image acquirer 300 accumulates first motions estimated between adjacent images from the reference image ($0^{th}$ image) to an arbitrary image (the $n^{th}$ image, i.e., the current image) and applies the accumulation result to an arbitrary image (the $n^{th}$ image, i.e., the current image) having a first compensated motion that has undergone an inverse transformation to acquire the first stabilized image of the current image with respect to the reference image (the $0^{th}$ image).

The first stabilized image acquirer 300 includes a first compensated motion acquirer 310 and a first stabilized image outputter 320.

An operation of the first compensated motion acquirer 310 will now be described in detail. The first compensated motion acquirer 310 extracts characteristic points from a first image (an $n-1^{th}$ image of FIG. 2, i.e., a previous image) of the adjacent images and tracks characteristic points within a second image (an $n^{th}$ image of FIG. 2, i.e., a current image) of the adjacent images to acquire corresponding points corresponding to the characteristic points. The first compensated motion acquirer 310 estimates a motion of the second image with respect to the first image by using Equation 1 above, i.e., estimates a first motion through motions of the corresponding points with respect to the characteristic points, and acquires a first compensated motion into which an accumulation result of other first motions, which are estimated between adjacent images from the first motion and the reference image (the $0^{th}$ image) to the previous image (the $n-1^{th}$ image), is transformed.

Figure 3A:
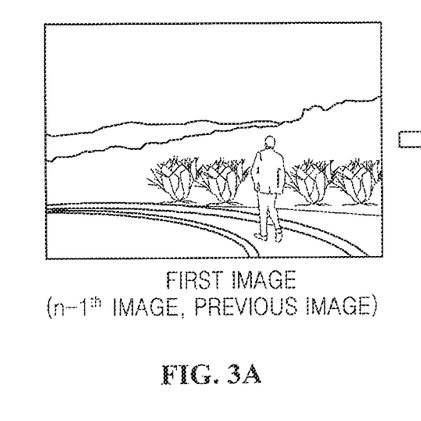
FIGS. 3A through 3D are images illustrating a process of extracting characteristic points.
Figure 3B:
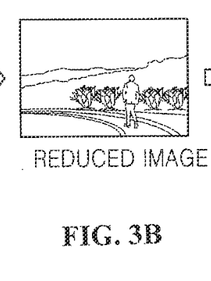
Figures 3C, 3D:
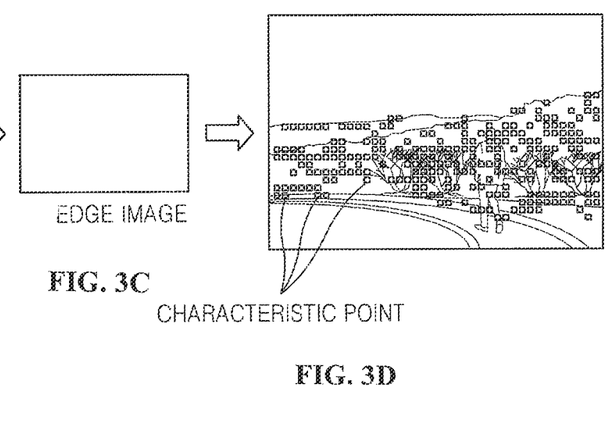

FIGS. 3A through 3D are views illustrating a process of extracting characteristic points from the first image (the $n-1^{th}$ image, i.e., the previous image) of the adjacent images through the first compensated motion acquirer 310. FIG. 3A illustrates the first image (the $n-1^{th}$ image, i.e., the previous image), FIG. 3B illustrates a reduced image of the first image (the $n-1^{th}$ image, i.e., the previous image), and FIG. 3C illustrates an edge image of the reduced first image (the $n-1^{th}$ image, i.e., the previous image). If the number of edges existing in an arbitrary block (for example, 3×3 block of an edge image exceeds a threshold value, the first compensated motion acquirer 310 may extract the corresponding block as a characteristic point. Here, the first compensated motion acquirer 310 may adjust a width and a height of a block to change a threshold value in order to remove a characteristic point existing on an edge having a high probability of failure of tracking a characteristic point and select a characteristic point positioned at an intersection between edges or at a corner. FIG. 3D illustrates characteristic points that are extracted if the number of edges existing in a block of an edge image exceeds a threshold value.

Figure 4A:
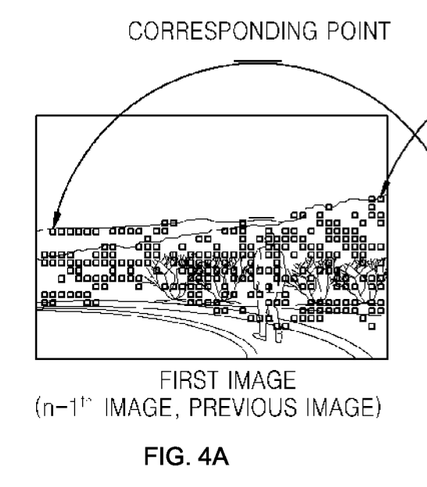
FIGS. 4A and 4B are images illustrating a process of acquiring corresponding points.
Figure 4B:
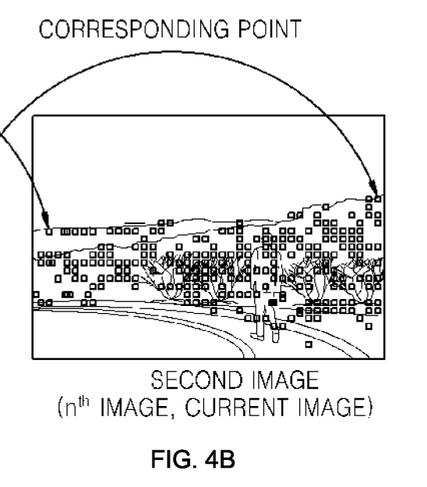

If the characteristic points are completely extracted from the edge image as described above, the first compensated motion acquirer 310 tracks characteristic points extracted in a second image (an $n^{th}$ image, i.e., a current image) of adjacent images to acquire corresponding points corresponding to the characteristic points. This may be referred to as an operation for detecting positions of the characteristic points of the first image (the $n-1^{th}$ image, i.e., the previous image) from the second image (the $n^{th}$ image, i.e., the current image). The first compensated motion acquirer 310 may acquire the corresponding points by using a Kanade-Lucas-Tomasi (KLT) tracking algorithm, a Taylor expansion, and a Hessian matrix. FIGS. 4A and 4B illustrate corresponding points that are results of tracking positions of the characteristic points of the first image (the $n-1^{th}$ image, i.e., the previous image) in the second image (the $n^{th}$ image, i.e., the current image).

If the corresponding points are completely acquired, the first compensated motion acquirer 310 tracks a first motion as a motion of the second image (the $n^{th}$ image, i.e., the current image) with respect to the first image (the $n-1^{th}$ image, i.e., the previous image) and acquires a first compensated motion as a result of accumulating the first motion and other first motions estimated between adjacent images from the reference image (the $0^{th}$ image) to the previous image (the $n-1^{th}$ image).

Figure 5A:
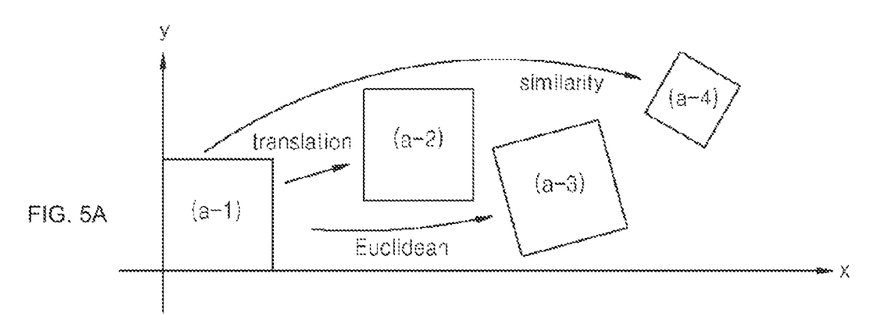
FIGS. 5A and 5B are views illustrating a process of estimating a motion.

The first compensated motion acquirer 310 uses a motion model to estimate the first motion. Image stabilization may be classified into 2-dimensional (2D) image stabilization or 3-dimensional (3D) image stabilization according to an image or a camera motion. As shown in FIG. 5A, the 2D image stabilization may use a translational motion model a-2, an Euclidean motion model a-3, a similarity motion model a-4, etc. based on a reference square model a-1. In the 2D image stabilization, an estimated image motion is immediately used for image conversion, and thus a structure is relatively simple, and a processing speed is fast. The motion model used in the 2D image stabilization may vary according to types of sways of a camera.

If the camera sways only in x-axis and y-axis direction, only the translational motion model a-2 is used. If a roll rotation (a z-axis rotation) occurs, the translational motion model a-2 extends to the Euclidean motion model a-3. If the camera moves back and forth or a size of an image changes, such as zoom, the motion model a-2 extends to the similarity motion model a-4. In an environment in which a depth change occurs, an affine motion model (not shown) or a projective motion model (not shown) has a high performance. However, image distortion, such as a shearing phenomenon, that may not be due to a real motion of the camera may occur, and thus a performance may be deteriorated. Therefore, in the image stabilization according to the present exemplary embodiment, the similarity motion model a-4 is used to cope with the sways in the x-axis and y-axis directions, the roll rotation, the image size change, as shown in FIG. 5B.

Figure 5B:
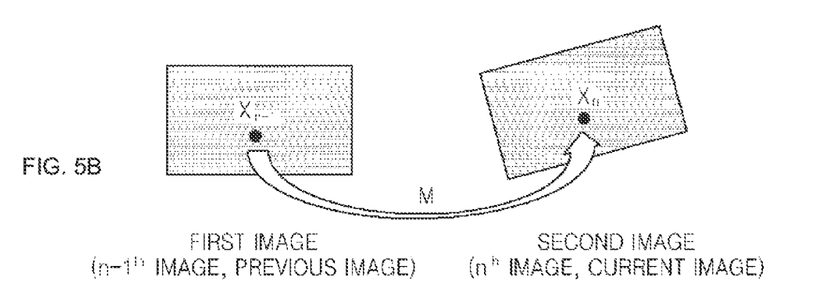

As shown in FIG. 5B, if corresponding points acquired from the first image (the $n-1^{th}$ image, i.e., the previous image) and the second image (the $n^{th}$ image, i.e., the current image) are respectively $X_{n-1}=(x_{n-1}, y_{n-1})$ and $X_n=(x_n, y_n)$, a relation between the corresponding points may be expressed as a similarity motion as in Equation 2 below:

$$s\begin{bmatrix} \cos\theta & -\sin\theta \\ \sin\theta & \cos\theta \end{bmatrix}\begin{bmatrix} x_{n-1} \\ y_{n-1} \end{bmatrix} + \begin{bmatrix} T_x \\ T_y \end{bmatrix} = \begin{bmatrix} x_n \\ y_n \end{bmatrix} \quad (2)$$

wherein S, θ, $T_x$, and $T_y$ respectively denote the image size change, the roll rotation, and movements in the x-axis and y-axis directions. The motion estimation performed by the first compensated motion acquirer 310 may be a calculation of motion parameters S, θ, $T_x$, and $T_y$ between corresponding points. If two parameters S and θ are replaced with S cos θ=a and S sin θ=b in Equation 2 above, Equation 3 below is obtained:

$$\begin{cases} x'_{n-1}a - y'_{n-1}b + T_x = x_n \\ x'_{n-1}a + y'_{n-1}b + T_y = y_n \end{cases} \quad (3)$$

As in Equation 3 above, two equations are formed for a pair of corresponding points, in which there are four unknown values corresponding to a motion parameter of the similarity motion model. Therefore, if two pairs of corresponding points are known, a motion parameter may be calculated as in Equation 4 below.

$$\begin{bmatrix} x_{n-1,1} & -y_{n-1,1} & 1 & 0 \\ x_{n-1,1} & y_{n-1,1} & 0 & 1 \\ x_{n-1,2} & -y_{n-1,2} & 1 & 0 \\ x_{n-1,2} & y_{n-1,2} & 0 & 1 \end{bmatrix}\begin{bmatrix} a \\ b \\ T_x \\ T_y \end{bmatrix} = \begin{bmatrix} x_{n,1} \\ y_{n,2} \\ x_{n,2} \\ y_{n,2} \end{bmatrix} \quad (4)$$

$$\begin{bmatrix} a \\ b \\ T_x \\ T_y \end{bmatrix} = \begin{bmatrix} x_{n-1,1} & -y_{n-1,1} & 1 & 0 \\ x_{n-1,1} & y_{n-1,1} & 0 & 1 \\ x_{n-1,2} & -y_{n-1,2} & 1 & 0 \\ x_{n-1,2} & y_{n-1,2} & 0 & 1 \end{bmatrix}^{-1}\begin{bmatrix} x_{n,1} \\ y_{n,1} \\ x_{n,2} \\ y_{n,2} \end{bmatrix}$$

Among corresponding points that are detected by tracking or matching characteristic points, there may exist inlier points that are accurately matched to corresponding points and outlier points that are wrongly matched to corresponding points. If the outlier points are used to calculate the motion parameters S, θ, $T_x$, and $T_y$, inaccurate motion parameters S, θ, $T_x$, and $T_y$ are calculated. In order to solve this problem, a RANdom Sample Consensus (RANSAC) algorithm is generally used. Even if a ratio of the outlier points is high, in order to stably calculate motion parameters S, θ, $T_x$, and $T_y$, in the image stabilization of the present exemplary embodiment, an existing RANSAC algorithm is modified into an adaptive RANSAC algorithm to adaptively change a threshold value that distinguishes inlier points from outlier points. For example, if a ratio of the inlier points is lower than a predetermined ratio, the threshold value may be reduced.

According to the above-described method, the motion of the second image (the $n^{th}$ image, i.e., the current image) with respect to the first image (the n-1$^{th}$ image, i.e., the previous image), i.e., a first motion $\tilde{M}_{n-1}^n$, may be acquired as in Equation 5 below.

$$\tilde{M}_{n-1}^n = \begin{bmatrix} a & -b & T_x \\ b & a & T_y \\ 0 & 0 & 1 \end{bmatrix} \quad (5)$$

A first compensated motion $\tilde{M}_c$ of the second image (the $n^{th}$ image, i.e., the current image) with respect to the first image (the n-1$^{th}$ image, i.e., the previous image) may be acquired by using the first motion $M_{n-1}^n$ calculated in Equation 5 above, as in Equation 6 below.

$$\tilde{M}_c = (\tilde{M}_{n-1}^n)^{-1} \quad (6)$$

$$\tilde{M}_c = \begin{bmatrix} a_n & -b_n & T_{xn} \\ b_n & a_n & T_{yn} \\ 0 & 0 & 1 \end{bmatrix}$$

There has been described above a first method of image stabilization for calculating the first motion $\tilde{M}_{n-1}^n$ of the second image (the $n^{th}$ image, i.e., the current image) with respect to the first image (the n-1$^{th}$ image, i.e., the previous image) and calculating the first compensated motion $\tilde{M}_c$ into which the first motion $\tilde{M}_{n-1}^n$ is inversely transformed. In a second method of image stabilization, a first motion $\tilde{M}_0^n$ and a first compensated motion $\tilde{M}_c$ from the reference image (the 0$^{th}$ image) to the second image (the $n^{th}$ image, i.e., the current image) are calculated by using accumulation. In the present exemplary embodiment, the second method, using Equation 1 above, is applied.

Therefore, the first compensated motion acquirer 310 accumulates the first motion $\tilde{M}_{n-1}^n$ of the second image (the $n^{th}$ image, i.e., the current image) with respect to the first image (the n-1$^{th}$ image, i.e., the previous image) and other first motions $\tilde{M}_0^{n-1}:\tilde{M}_{n-2}^{n-1}, \tilde{M}_{n-3}^{n-2}, \ldots, \tilde{M}_1^2$, and $\tilde{M}_0^1$ from the reference image (the 0$^{th}$ image) to the first image (the n-1$^{th}$ image, i.e., the previous image) to calculate a first motion accumulation result $\tilde{M}_0^n$ and calculate a first compensated motion $\tilde{M}_c = (\tilde{M}_0^n)^{-1}$ into which the first motion result $\tilde{M}_0^n$ is inversely transformed.

The first stabilized image outputter 320 applies the first compensated motion $\tilde{M}_c$ to the second image (the $n^{th}$ image, i.e., the current image) to output a first stabilized image.

The first stabilized image output from the first stabilized image acquirer 300 may be referred to as a pseudo stabilized image including a drift error for the following reasons: Motions between adjacent images from the reference image (the 0$^{th}$ image) to the second image (the $n^{th}$ image, i.e., the current image) are accumulated to calculate the first motion accumulation result $\tilde{M}_0^n$. Therefore, a drift error may be removed from a motion estimated between adjacent images and may also be accumulated which increases a probability of failure in stabilizing an image. All of the motions $\tilde{M}$ displayed in the first compensated motion acquirer 310 and the first stabilized image outputter 320 include drift errors.

The first stabilized image acquired through the first stabilized image acquirer 300 is very similar to the reference image (the 0$^{th}$ image). Although a motion exists between the first stabilized image and the reference image (the 0$^{th}$ image), the motion is a very weak motion. Although a mismatch occurs between the first stabilized image and the reference image (the 0$^{th}$ image) due to the drift error, the motion is weak. Therefore, corresponding points between the first stabilized image and the reference image (the 0$^{th}$ image) may be easily acquired through tracking, and a motion between the first stabilized image and the reference image (the 0$^{th}$ image) may be calculated by using the corresponding points. A second stabilized image that is finally output from this is a stabilized image from which drift errors accumulated until now have been removed.

The second stabilized image acquirer 400 acquires a second motion estimated between the first stabilized image and the reference image (the $0^{th}$ image) and applies the second motion and a second compensated motion, into which a accumulation result of the first compensated motion has been inversely transformed, to the second image (the $n^{th}$ image) to acquire the second stabilized image from which a drift error has been removed.

The second stabilized image acquirer 400 includes a second motion acquirer 410, a second compensated motion acquirer 420, and a second stabilized image outputter 430.

The second motion acquirer 410 acquires a second motion $M_{refine}$ estimated between the reference image ($0^{th}$ image) and the first stabilized image output from the first stabilized image acquirer 300. The second motion acquirer 410 extracts characteristic points from the reference image ($0^{th}$ image) and tracks characteristic points within the first stabilized image to acquire corresponding points corresponding to the characteristic points. The descriptions of the estimation of the characteristic points of the reference image ($0^{th}$ image) and the acquisition of the corresponding points between the reference image ($0^{th}$ image) and the first stabilized image have been disclosed above and thus are omitted herein.

If the corresponding points are completely acquired, the second motion acquirer 410 estimates a second motion as a motion of the first stabilized image with respect to the reference image ($0^{th}$ image). As described above, the second motion acquirer 410 estimates a second motion $M_{refine}$ whose motion parameters S, θ, $T_x$, and $T_y$ have been calculated, by using a similarity motion model. Here, the estimated second motion $M_{refine}$ is equal to an amount of drift error.

The second compensated motion acquirer 420 acquires a second compensated motion $M_c = (M_{refine} \cdot \tilde{M}_0^n)^{-1}$ into which accumulation results of the first motion accumulation result $\tilde{M}_0^n$ and the second motion $M_{refine}$ have been inversely transformed.

If a pixel coordinate of the first stabilized image (the pseudo stabilized image) is expressed as $x_{psudo\_stable(n)}$ and a pixel coordinate of an unstable image corresponding to the pixel coordinate $x_{psudo\_stable(n)}$ is expressed as $x_{unstable(n)}$, Equation 7 below is acquired.

$$X_{psudo\_stable(n)} = \tilde{M}_0^n \cdot x_{unstable(n)} \quad (7)$$

In order to remove a drift error existing in the first stabilized image, the second motion $M_{refine}$ between the reference image ($0^{th}$ image) and the first stabilized image may be calculated as in Equation 8 below.

$$x_{reference(0)} = M_{refine} \cdot x_{psudo\_stable(n)} \quad (8)$$

Equation 7 is substituted into Equation 8 to acquire a motion of the unstable image $x_{unstable(n)}$ with respect to the reference image (the $0^{th}$ image $x_{reference(0)}$) and thus acquire as in Equation 9 below.

$$x_{reference(0)} = M_{refine} \cdot \tilde{M}_0^n \cdot x_{unstable(n)} \quad (9)$$

A motion $M_0^n$ of the unstable image $x_{unstable(n)}$ with respect to the reference image (the $0^{th}$ image $X_{reference(0)}$) is calculated as in Equation 10 below.

$$x_{reference(0)} = M_0^n \cdot x_{psudo\_stable(n)}$$

$$\therefore M_0^n = M_{refine} \cdot \tilde{M}_0^n \quad (10)$$

Therefore, an accumulation result $\tilde{M}_0^n$ of first motions and a second compensated motion $M_c = (M_{refine} \cdot \tilde{M}_0^n)^{-1}$, into which an accumulation result of the second motion $M_{refine}$ is inversely transformed, are acquired. Here, the second compensated motion that is not inversely transformed is a motion from which the drift error of the first stabilized image has been removed with respect to the reference image.

The second stabilized image outputter 430 applies the second compensated motion $M_c$ to the first stabilized image to finally output the second stabilized image.

Second image stabilization processing may be performed as described above to remove a drift error remaining after the first image stabilization processing in order to reduce failures in stabilizing an image and reduce image deterioration.

A method of stabilizing an image, according to an exemplary embodiment, will now be described with reference to FIG. 6. The method may be performed by the apparatus 100 shown in FIG. 1. The same descriptions as those of FIGS. 1 through 5 are omitted herein.

Figure 6:
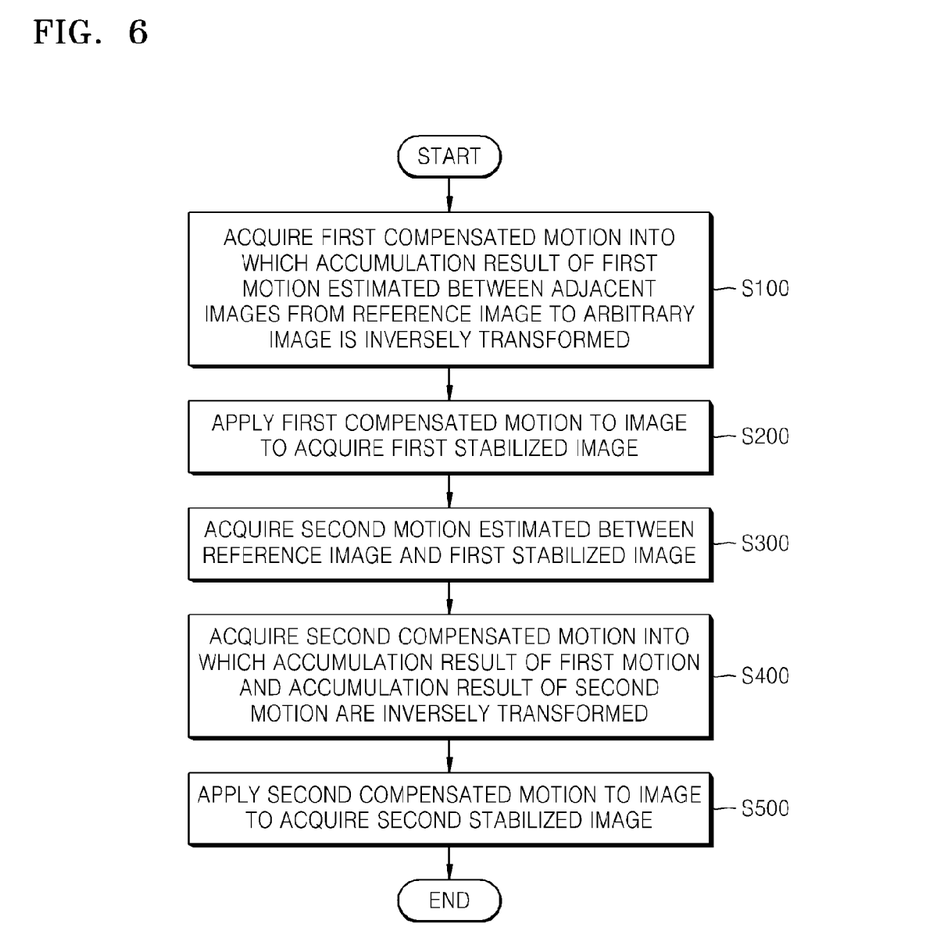
FIG. 6 is a flowchart of a method of stabilizing an image, according to an exemplary embodiment.

Referring to FIG. 6, in operation S100, the apparatus 10 acquires a first compensated motion $\tilde{M}_c = (\tilde{M}_0^n)^{-1}$ into which a first motion accumulation result $\tilde{M}_0^n$, estimated between adjacent images from a reference image (an $0^{th}$ image) to an arbitrary image (an $n^{th}$ image, i.e., a current image), has been inversely transformed.

The apparatus 10 extracts characteristic points from a first image (an $n-1^{th}$ image, i.e., a previous image) of the adjacent images and tracks characteristic points within a second image (an $n^{th}$ image, i.e., a current image) of the adjacent images to acquire corresponding points corresponding to the characteristic points. The apparatus 10 estimates a motion of the second image (the $n^{th}$ image, i.e., the current image) with respect to the first image (the $n-1^{th}$ image, i.e., the previous image), i.e., a first motion $\tilde{M}_0^n$ as a motion of the corresponding points with respect to the characteristic points. The apparatus 10 also acquires the first compensated motion $\tilde{M}_c = (\tilde{M}_0^n)^{-1}$ into which an accumulation result $\tilde{M}_0^n$ of the first motion and another first motion $\tilde{M}_0^{n-1}$, estimated between the adjacent images from the reference image (an $0^{th}$ image) to the first image (an $n-1^{th}$ image, i.e., the previous image), has been inversely transformed.

In operation S200, the apparatus 10 applies the first compensated motion $\tilde{M}_c$ to the second image (the $n^{th}$ image, i.e., the current image) to acquire a first stabilized image.

The first stabilized image may be referred to as a pseudo stabilized image including a drift error for the following reasons: Motions between adjacent images from the reference image (the $0^{th}$ image) to the second image (the $n^{th}$ image, i.e., the current image) are accumulated to calculate the first motion $\tilde{M}_0^n$. Therefore, a drift error may be removed from a motion estimated between adjacent images and may also be accumulated which increases a probability of failure in stabilizing an image. Therefore, an operation for removing such a drift error is performed.

If the first stabilized image is acquired, the apparatus 10 acquires a second motion $M_{refine}$, estimated between the reference image (the $0^{th}$ image) and the first stabilized image, in operation S300.

The apparatus 10 extracts characteristic points from the reference image (the $0^{th}$ image) and tracks characteristic points within the first stabilized image to acquire corresponding points corresponding to the characteristic points. If the corresponding points are completely acquired, the apparatus 10 estimates the second motion $M_{refine}$ as a motion of the first stabilized image with respect to the reference image (the $0^{th}$ image). As described above, the apparatus 10 estimates the second motion $M_{refine}$ whose motion parameters S, θ, $T_x$, and $T_y$ have been calculated, by using a similarity motion model. Here, the second motion $M_{refine}$ is equal to an amount of drift error.

If the second motion $M_{refine}$ is completely acquired, the apparatus 100 acquires a second compensated motion $M_c = (M_{refine} \cdot \tilde{M}_0^n)^{-1}$ into which an accumulation result of the first motion accumulation result $\tilde{M}_0^n$ and the second motion $M_{refine}$ have been inversely transformed, in operation S400. Here, a second compensated motion that has not been inversely transformed is a motion from which a drift error of the first stabilized image has been removed with respect to the reference image.

If the second compensated motion $M_c$ is completely acquired, the apparatus 10 applies the second compensated motion $M_c$ to the first stabilized image to finally output a second stabilized image from which a drift error has been removed, in operation S500.

As described above, according to the exemplary embodiments, a drift error, which remains after a first image stabilization process, is removed through second image stabilization processing to reduce failures in stabilizing an image and reduce image deterioration.

The exemplary embodiments can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion. Also, functional programs, codes, and code segments for accomplishing the exemplary embodiments can be easily construed by programmers skilled in the art to which the exemplary embodiments pertain.

While the exemplary embodiments have been particularly shown and described, it will be understood by those of ordinary skill in the art that various changes in form and details may be made therein without departing from the spirit and scope of the inventive concept as defined by the following claims.

What is claimed is:

1. A method of stabilizing a target image, the method comprising:
   applying a first compensated motion to the target image to acquire a first stabilized image, wherein an accumulation result of first motions, each of which is estimated between adjacent images from a reference image to the target image, in a plurality of images sequentially obtained by a camera, is inversely transformed into the first compensated motion; and
   acquiring a second motion estimated between the reference image and the first stabilized image and applying a second compensated motion to the target image to acquire a second stabilized image, wherein the accumulation result of first motions and the second motion are inversely transformed into the second compensated motion.

2. The method of claim 1, wherein the first stabilized image comprises drift errors with respect to the first motions.

3. The method of claim 2, wherein the second stabilized image is an image from which the drift errors have been removed by the second compensated motion.

4. The method of claim 1, wherein the acquiring of the first stabilized image comprises:
   acquiring the first compensated motion into which the accumulation result of the first motions, each of which is estimated between adjacent images from the reference image to the target image, is inversely transformed; and
   inversely applying the first compensated motion to the target image to acquire the first stabilized image.

5. The method of claim 4, wherein the acquiring of the first compensated motion comprises:
   extracting characteristic points from a first image of the adjacent images;
   tracking the characteristic points within a second image of the adjacent images to acquire corresponding points corresponding to the characteristic points;
   estimating a first motion of the first motions as a motion of the second image with respect to the first image by using the corresponding points; and
   acquiring the first compensated motion into which an accumulation result of the first motion and other first motions of the first motions, each of which is estimated between the adjacent images from the reference image to the first image, is inversely transformed.

6. The method of claim 5, wherein the extracting of the characteristic points comprises:
   reducing the first image and acquiring an edge image; and
   in response to the number of edges existing in an arbitrary block of the edge image exceeding a threshold value, extracting the arbitrary block as a characteristic point of the characteristic points.

7. The method of claim 5, wherein the estimating of the first motions comprises estimating of the first motions comprising movements, rotations, and size changes of the corresponding points.

8. The method of claim 1, wherein the acquiring of the second stabilized image comprises:
   acquiring the second motion estimated between the reference image and the first stabilized image;
   acquiring the second compensated motion into which the accumulation result of the first motions and the second motion are inversely transformed; and
   applying the second compensated motion to the target image to acquire the second stabilized image.

9. The method of claim 8, wherein the acquiring of the second motion comprises:
   extracting characteristic points from the reference image;
   tracking the characteristic points within the first stabilized image to acquire corresponding points corresponding to the characteristic points; and
   estimating the second motion as a motion of the first stabilized image with respect to the reference image by using the corresponding points.

10. The method of claim 9, wherein the extracting of the characteristic points comprises:
    reducing the reference image and acquiring an edge image; and
    in response to the number of edges existing within an arbitrary block of the edge image exceeds a threshold value, extracting the arbitrary block as a characteristic point of the characteristic points.

11. The method of claim 9, wherein the acquiring of the second motion comprises acquiring the second motion comprising movements, rotations, and size changes of the corresponding points.

12. An apparatus for stabilizing a target image, the apparatus comprising:
    at least one processor which implements:

a first stabilized image acquirer configured to accumulate first motions, each of which is estimated between adjacent images from a reference image to the target image, in a plurality of images sequentially obtained by a camera, and inversely apply the accumulation result as a first compensated motion to the target image to acquire a first stabilized image; and a second stabilized image acquirer configured to acquire a second motion, estimated between the reference image and the first stabilized image, and apply a second compensated motion, into which the accumulation result of the first motions and the second motion are inversely transformed, to the target image to acquire a second stabilized image.

13. The apparatus of claim 12, wherein the first stabilized image comprises drift errors with respect to the first motions, and the second stabilized image is an image from which the drift errors have been removed by the second compensated motion.

14. The apparatus of claim 12, wherein the first stabilized image acquirer comprises:

a first compensated motion acquirer configured to acquire the first compensated motion into which the accumulation result of the first motions, each of which is estimated between adjacent images from the reference image to the target image, is inversely transformed; and a first stabilized image outputter configured to apply the first compensated motion to the target image to output the first stabilized image.

15. The apparatus of claim 14, wherein the first compensated motion acquirer is further configured to extract characteristic points from a first image of the adjacent images, track the characteristic points within a second image of the adjacent images to acquire corresponding points corresponding to the characteristic points, estimate a first motion of the first motions as a motion of the second image with respect to the first image by using the corresponding points, and acquire the first compensated motion into which the first motion and other first motions of the first motions, each of which is estimated between the adjacent images from the reference image to a previous image of the target image, are inversely transformed.

16. The apparatus of claim 12, wherein the second stabilized image acquirer comprises:

a second motion acquirer configured to acquire the second motion estimated between the reference image and the first stabilized image;

a second compensated motion acquirer configured to acquire the second compensated motion into which the accumulation result of the first motion and the second motion are inversely transformed; and a second stabilized image outputter configured to apply the second compensated motion to the target image to output the second stabilized image.

17. The apparatus of claim 16, wherein the second motion acquirer is further configured to extract characteristic points from the reference image, track the characteristic points within the first stabilized image to acquire corresponding points corresponding to the characteristic points, and estimate the second motion as a motion of the first stabilized image with respect to the reference image by using the corresponding points.

18. The apparatus of claim 17, wherein the second motion acquirer is further configured to reduce the reference image, acquire an edge image, and in response to the number of edges existing in an arbitrary block of the edge image exceeding a threshold value, extract the arbitrary block as a characteristic point of the characteristic points.

19. The apparatus of claim 17, wherein the second motion acquirer is further configured to acquire the second motion comprising movements, rotations, and size changes of the corresponding points.

20. A non-transitory computer-readable recording medium having recorded thereon a program which, when executed by a computer, performs a method of stabilizing a target image comprising:

acquiring a first compensated motion into which an accumulation result of first motions, each of which is estimated between adjacent images from a reference image to the target image, in a plurality of images sequentially obtained by a camera, is inversely transformed;

inversely applying the first compensated motion to the target image to acquire a first stabilized image;

acquiring a second motion estimated between the reference image and the first stabilized image;

acquiring a second compensated motion into which the accumulation result of the first motions and the second motion are inversely transformed; and applying the second compensated motion to the target image to acquire a second stabilized image.

* * * * *